US012619970B1

(12) United States Patent     (10) Patent No.:   US 12,619,970 B1

Grassadonia et al.     (45) Date of Patent:   *May 5, 2026

(54) PAYMENT MESSAGE INTERCEPTION

(71) Applicant: Block, Inc., Oakland, CA (US)

(72) Inventors: Brian Grassadonia, San Francisco, CA (US); Tobi Kral, San Francisco, CA (US); Eric Firestone, San Francisco, CA (US); Kristopher David Stipech, West Hollywood, CA (US); Michael Dustin Moring, San Francisco, CA (US)

(73) Assignee: Block, Inc., Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/634,641

(22) Filed: Apr. 12, 2024

Related U.S. Application Data

(63) Continuation of application No. 17/333,856, filed on May 28, 2021, now abandoned, which is a
(Continued)

(51) Int. Cl.
| | |
|---|---|
| *G06Q 40/00* | (2023.01) |
| *G06Q 20/10* | (2012.01) |
| *G06Q 20/22* | (2012.01) |
| *G06Q 20/32* | (2012.01) |
| *G06Q 20/40* | (2012.01) |

(52) U.S. Cl.
CPC ......... *G06Q 20/223* (2013.01); *G06Q 20/102* (2013.01); *G06Q 20/322* (2013.01); *G06Q 20/4016* (2013.01)

(58) Field of Classification Search
None
See application file for complete search history.

(56) References Cited

U.S. PATENT DOCUMENTS

| | | | | |
|---|---|---|---|---|
| 11,023,873 B1* | 6/2021 | Grassadonia | .......... | G06Q 40/03 |
| 2006/0253340 A1* | 11/2006 | Levchin | ................. | G06Q 20/40 |
| | | | | 705/26.1 |

(Continued)

FOREIGN PATENT DOCUMENTS

| | | |
|---|---|---|
| WO | 03/001866 A1 | 1/2003 |
| WO | 03/038553 A2 | 5/2003 |

(Continued)

*Primary Examiner* — Olabode Akintola
(74) *Attorney, Agent, or Firm* — Lee & Hayes, P.C.

(57) ABSTRACT

A payment service may receive a first payment request from a first user seeking funds from a second user. Having determined that the second user's account lacks sufficient funds, the payment service may send the second user an offer of funds to be repaid in installments. Once accepted, the amount is transferred from a host account to the first user's account. A second payment request seeking funds from a third user may be received. If the second user's account has a balance associated with repayment of the offered funds, the payment service intercepts a payment message to deposit funds for the second payment request from the third user's account into the second user's account. Responsive to intercepting the payment message and prior to any funds associated with the payment message being deposited, the payment service may modify the instructions to divert the funds to the host account.

20 Claims, 10 Drawing Sheets

Related U.S. Application Data continuation of application No. 15/476,604, filed on Mar. 31, 2017, now Pat. No. 11,023,873.

(56)                     References Cited

U.S. PATENT DOCUMENTS

| | | | |
|---|---|---|---|
| 2008/0120218 A1* | 5/2008 | Reid | G06Q 40/03 |
| | | | 705/37 |
| 2009/0164370 A1* | 6/2009 | Sorbe | G06Q 20/20 |
| | | | 705/40 |
| 2012/0030100 A1* | 2/2012 | Bulawa | G06Q 40/00 |
| | | | 705/40 |
| 2012/0054097 A1* | 3/2012 | Frohwein | G06Q 20/40 |
| | | | 705/40 |
| 2017/0178113 A1* | 6/2017 | Mugford | G06Q 20/102 |
| 2019/0057373 A1 | 2/2019 | Van et al. | |

FOREIGN PATENT DOCUMENTS

| | | |
|---|---|---|
| WO | 2006/076503 A2 | 7/2006 |
| WO | 2008/063810 A1 | 5/2008 |

* cited by examiner

PAYMENT MESSAGE INTERCEPTION

PRIORITY

This application is a continuation of and claims priority to U.S. patent application Ser. No. 17/333,856, filed May 28, 2021, which claims priority to U.S. patent application Ser. No. 15/476,604, filed Mar. 31, 2017, and issued as U.S. Pat. No. 11,023,873 on Jun. 1, 2021, all of which are incorporated herein by reference.

BACKGROUND

Mobile and online payment processing makes payments easier by giving users access to electronic funds wherever they can get an internet connection. These mobile payments are commonly associated with a preexisting credit card, debit card, ABA number associated with a bank account, or balance stored on a payment service. By connecting these traditional payment methods with a mobile application, users can make payments more easily by avoiding the need to use traditional payment methods, e.g., obtain funds or swipe cards. Because people might not be familiar with using a mobile or online payment application, transitioning to such applications can be difficult. Making such applications easier and more frictionless can increase usage, thereby generating more sales and generating more transactions.

DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DESCRIPTION

Mobile payments allow for easier methods of making payments or transferring funds. However, additional improvements are possible. For instance, users of a payment service, e.g., internet payment service providers (IPSP), might not have funds available on the payment service. These users might also not have a credit or debit card, so the users may not be able to participate in mobile payments. Therefore, there is a need both to help these people participate in mobile and online payments and to give others additional methods of making mobile payments.

One example for allowing access to mobile payments is to offer an advance funds transfer to users, which can be accomplished by using a technical infrastructure that has visibility to many aspects of a networked payment infrastructure. This technical infrastructure allows for visibility into user's purchase history, payment history, direct deposit history, and many other areas of the user's financial history. Users who could not previously participate in mobile payments can now receive an advance funds transfer to make mobile payments. In addition, previous mobile payment users now can have an additional option for making payments. The additional option can allow for increased usage of mobile payments for users, additional revenue for the payment service provider, faster payments, and a more efficient flow of goods and services.

Figure 1:
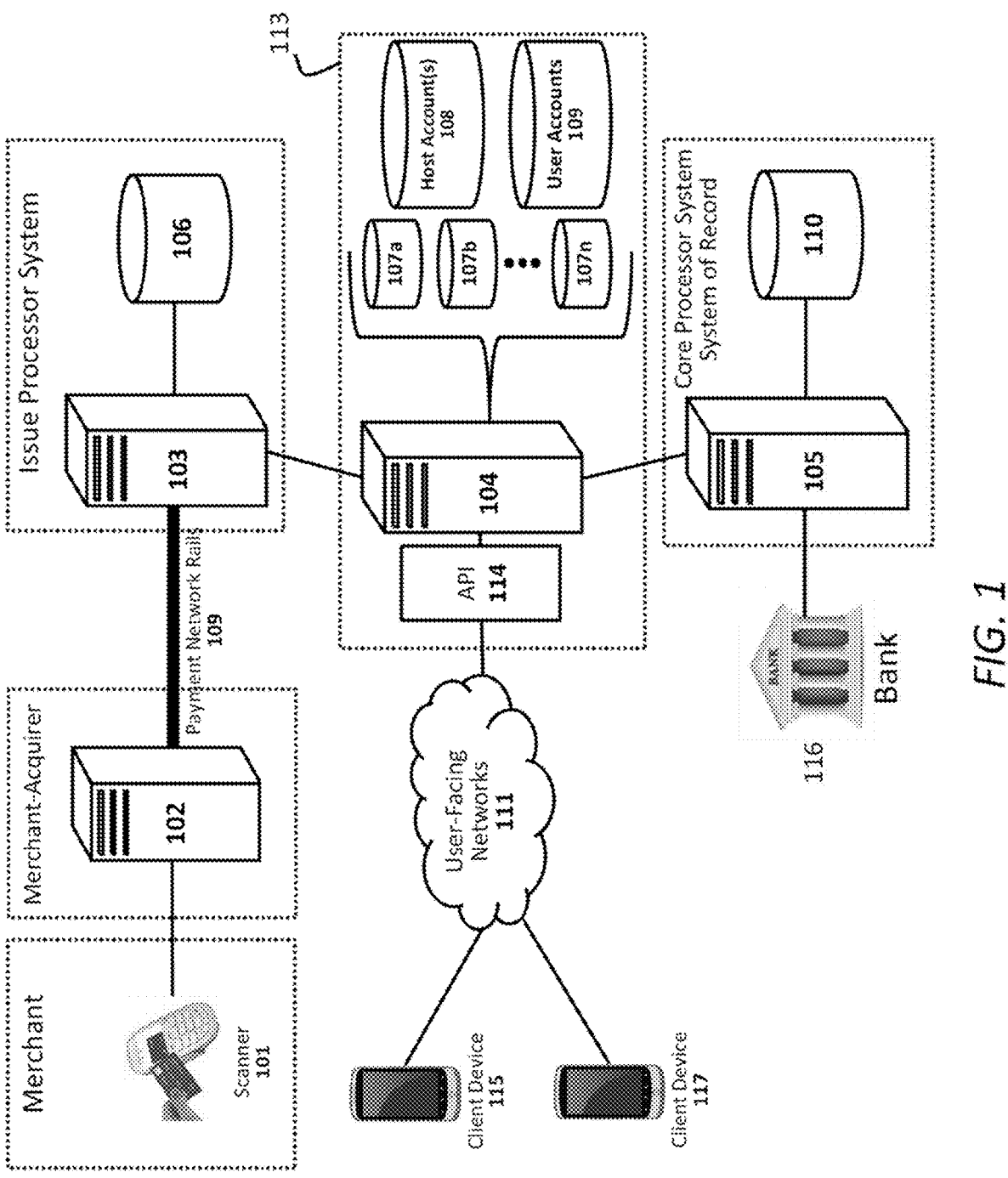
FIG. 1 illustrates an example of a system for processing payments, according to an embodiment.

The proposed system for intelligent advancement of funds is technically different from prior solutions. With the intelligent advancement funds, the user will be aware of and accept terms of the advance funds transfer before proceeding with a purchase. This disclosure includes technical examples for solving the problem of enhancing mobile and online payments. These examples can take advantage of unique network infrastructures that give payment services insight into user behavior, e.g., purchase history, access to funds, payment history, types of purchases, location of purchases, social network, computing platform usage, debit history, credit history, and other demographic information. An example of this infrastructure is illustrated in FIG. 1, described below. By taking advantage of these unique network infrastructures, embodiments have increased visibility of payment transactions, which affords the ability to uniquely advance funds to increase usage. The increased visibility can come from having visibility to transactions from both the merchant and they buyer's perspectives. This can allow the system to know exactly what the buyer is purchasing from the merchant. It can also allow the system to know what the buyer has bought in the past to know whether the buyer is likely to repay a possible advance funds transfer. Having better knowledge of whether the buyer is likely to repay an advance funds transfer reduces risk of default for the system. Increased usage can also make the payments platform more prevalent and increase market share.

System for Processing Payments, Sales, and an Advance Funds Transfer

FIG. 1 illustrates an embodiment of a system that includes several servers that handle various steps in a computerized system for tracking and presenting financial transactions, as well as displaying an account status based upon predicted transactions. Merchant computing device 101 can be a payment card processing terminal, such as a payment card scanner, that can request payment authorization to complete a sale. The merchant computing device 101, which can be any device capable of capturing purchase information or payment request data on behalf of a merchant, can receive an input (e.g., swipe or dip a card, wireless transmission, keypad entry) of a user's payment card information, such as card verification value (CVV or CVV1), card verification code (CVC or CVC1), card identifier (CID), and payment card number, into the merchant computing device 101. Non-limiting examples of a merchant computing device 101 may include a point of sales (POS) terminal, a payment card processing terminal (e.g., a payment card scanner), a server for an online site, and a cash register. Non-limiting examples of payment instruments may include magnetic stripe cards, EMV cards, debit cards, credit cards, stored value cards, gift cards, and virtual cards or tokens that may be stored one or more client devices 115 or 117 (e.g., user computing device, smartphone, mobile device, or computer). The merchant computing device 101 may comprise or may be coupled to various types of instrument readers configured to capture transaction data from certain types of payment instruments. For instance, if the payment instrument is a virtual card stored on a client device 115, and the client device 115 is configured to transmit payment request data for the virtual card using near field communications (NFC), then the merchant computing device 101 may comprise or may be coupled to an NFC scanner configured to capture the transaction data related to the virtual card via the NFC signal received from the client device 115. The client device can include one or more client applications stored in memory and executed on one or more processors. The client application can present information to the user and receive inputs from the user via, for example, a keyboard, mouse, or touchscreen. The client applications can be stored on a centralized server, such as the Google Play® store or iTunes®, and the user can download the applications from the centralized server to perform functions, such as those describe in this disclosure.

In operation, the merchant computing device 101 may capture payment card information and then generate and transmit a digital message, such as a payment authorization request, comprising the payment card information along with transaction data (e.g., transaction amount, merchant identifier) to a merchant-acquirer server 102. The merchant computing device 101 may be configured to generate digital messages containing the payment authorization request, which includes the payment card information and transaction data, may be generated according to particular protocols or specifications, e.g., one or more ISO standards in which the payment authorization request can contain certain fields for the payment card information and the transaction data. Non-limiting examples of data fields that may be included the digital message may include a merchant identifier (merchant ID), a merchant category code (MCC), an amount for the transaction, a timestamp (e.g., data, time), and a card number. In some implementations, the merchant computing device 101 may transmit the digital message containing the card and/or other payment information to a merchant-acquirer server 102, although in some embodiments, the digital message may be transmitted to other devices, such as an issuer processor server 103 of an issuer processor system.

Merchant-Acquirer

A merchant-acquirer server 102 may be any computing device configured to process an authorization request from a merchant and forward at least some of the information to an issuer processor server 103 over payment network rails 109 or card-issuer network (e.g., Visa® or MasterCard® networks). Each merchant computing device 101 is associated with a merchant-acquirer server 102 to process payment card payments. Although one merchant computing device 101 and one merchant-acquirer server 102 is shown, the system may comprise of more than one of each of the merchant computing device 101 and the merchant-acquirer server 102.

Payment Network Rails

Payment networks (e.g., Visa®, MasterCard®, and American Express®) may be entities that own and operate payment network rails 109, which may be a computing communications network configured to receive and transmit digital messages between merchants and merchant-acquirers to issuer processors and issuing banks. In operation, merchant computing devices 101 and merchant-acquirer servers 102 may generate, manipulate, and transmit digital messages containing payment authorization requests. The digital messages may be generated and manipulated according to the policies, standards, and protocols implemented by each particular payment network.

Issuer Processor

Issuer processor systems can establish payment card number records for customers, issue bills and statements, and process payments. The issuer processor server 103 can perform these functions and store transactions and payment card numbers in a storage device, such as database 106. Issuer processors will typically forward payment authorization requests to a system of record server 105. However, the exemplary system comprises a payment-service system server 104 positioned between issuer processor server 103 and system of record server 105. Furthermore, payment-service system server 104 can perform some or all of the functions typically associated with issuer processors, and therefore, in these embodiments, the merchant-acquirer server 102 can communicate over the payment network rails with payment-service system server 104. Although the issuer processor server 103 and the payment-service system server 104 are shown as separate computing platforms, the issuer processor server 103 and the payment-service system server 104 can be implemented as a single platform. The positioning of payment-service system server 104 in between issuer processor server 103 and system of record server 105 allows the payment-service system server 104 to provide added functionality to the system, such as intervene in and record transactions in the payment stream (e.g., intercept payment authorizations or offer a funds advance). As a result, payment-service system server 104 can also have access to all transactions associated with an account to provide further services to the client device 115 associated with the account.

Note that FIG. 1 illustrates a four-party scheme (or open scheme) in which the issuer processor server 103 is separate from the merchant-acquirer server 102. Embodiments of this disclosure can similarly function with three-party schemes (or closed schemes), such as (American Express®, Discover Card®, and Diners Club®), in which the issuer processor server 103 and the merchant acquirer server 102 are the same entity.

The payment-service system server 104 can be positioned between the issuer processor server 103 and the system of record server 105. Payment-service system server 104 is part of a payment-service system 113, which can also include an application programming interface (API) 114 and one or more databases 107a-107n, including a host account(s) database 108 and a user accounts database 109. Payment-service system server 104 can use API 114 to communicate with client device 115 over user-facing network 111, such as the internet. Databases 107a-107n, including user accounts database 109, can include information such a user profile, account numbers, payment sources, a resource database, and transaction ledgers. The host account(s) database can include one or more balances owned by the payment-service system 113. The host account balances can be used to offer services such as an advance funds transfer, and payment messages directed to user accounts can be diverted from a user account in the user accounts database 109 to a host account in the host account(s) database 108 to repay an advance funds transfer. In alternative embodiments, the account information can be stored in the same database, but different records. With this system architecture, payment-service system server 104 can intercept transmissions of transaction messages that occur between issuer processor server 103 and system of record server 105. The payment-service system server 104 does not need to perform an action on every transaction message, as the payment-service system server 104 can just relay the transaction message. After receiving a transaction from issuer processor server 103 and recording information from that transaction, payment-service system server 104 can forward the transaction to system of record server 105. The payment-service system 113 can also access a resource database (e.g., one of databases 107a-107n) to assess payment resources for the transaction. These resources can include funds stored in a local balance, credit cards, debit cards, or funds stored in a separate bank account.

System of Record

System of record server 105 can be hosted by a bank 116 or a third party that provides a service to a bank 116. Some banks maintain their own system of record servers. The system of record server 105 maintains the accurate information of the balance of an account maintained by bank 116. Other transactions may be pending or in various stages of the payment stream, but the official recordation of those transactions is by the system of record server 105 and database 110. Certain parties, such as the account owner, the merchant, the issuer processor, or the payment-service system 113, may assume certain risks that an account holder does not have sufficient funds to fund a transaction, until the system of record records and authorizes the transaction. However, these parties may assume that risk to process transactions more quickly and efficiently.

Upon receiving a payment authorization request, payment-service system server 104 can forward associated information to system of record server 105, which maintains an account corresponding to the payment card used in the payment transaction. Bank 116 can maintain the account using the system of record server 105, along with a ledger and other user profile information. System of record server 105 can also include database 110 that can store a copy of the ledger associated with the account record.

Payment-service system server 104 can also be in communication over user-facing networks 111 (e.g., the internet) with client device 115. Client device 115 is illustrated in FIG. 1 as a smartphone, but can be any computing device, such as any mobile phone, tablet, smart watch, personal data assistant, gaming console, or personal computer. Payment-service system 113 can also include several databases in communication with payment-service system server 104, such as database 107a for storing user profile information, database 107b for storing sub-account balances and ledgers, and database 107c for storing payment resources.

Payment-service system server 104 can communicate transactions to the system of record server 105, which can record in database 110 the payment authorization and further report it to the Federal Reserve and bank 116 that maintains the account record associated with the payment card used in the payment authorization. Bank 116 may also generate an authorization response to forward to the system of record server 105, back though other devices in the payment stream and eventually to the merchant computing device 101 to confirm that the merchant may complete the payment transaction.

The system can allow funds in an account to be physically and logically separated using a single account maintained at a bank 116 using database 110 and system of record server 105. Previously, users wanting to maintain separate accounts would have to open separate accounts at one or more banks 116. Embodiments of this disclosure described herein can rely on a single account, but physically and logically separate that account, maintained at system of record server 105, by maintaining a separate record in payment-service system server 104, using databases 107a-n. For example, database 107 could be configured as a database for storing user profile information. This profile information can include a username, password, account number, routing/transit number, and one or more pointers to sub-accounts and ledgers for the sub-accounts. Each sub-account can have an identifier, such as a string stating, "vacation savings," "groceries," or "car payment." Each sub-account can have a balance that is an allocated amount less than or equal to the balance of the associated account. However, the total of all of the balances of the sub-accounts can be equal to the account balance. In one embodiment, the sub-account totals can also differ from the account balance.

In some embodiments, assigning sub-accounts related to a single account allows for compartmentalization before payment, rather than allocated funds after a transaction. These embodiments allow for immediate updating of accounts during credit or debit transactions because the transactions occur using the sub-accounts, thereby updating the account record and sub-account records in real-time, rather than processing credit and debit transactions after the transaction completes. Databases 107a-n can also include a resource database identifying resources for payment, e.g., credit cards, debit cards, bank accounts, or loans. They can also track information concerning outstanding loan(s), funds advance(s) including a repayment plan and terms, amounts outstanding, and due dates. The repayment plan can include identification of sources of funds (e.g., direct deposits, awards points, debit card, credit card, account balances, bank account, or sub-account balances), payment due dates, interest rate, and late fees.

In some embodiments, the sum of balances of all of the sub-accounts records can be different from the balance of the account balance when there are credits and debits that have not been synchronized to the account record. For example, the owner of payment-service system server 104 might have a promotional bonus for using the service, and such funds from the promotional bonus can be maintained in a database 107 coupled to payment-service system server 104. The funds can be paid from a separate account owned by the host of payment-service system server 104. The payment-service system server 104 might also not immediately synchronize with the system of record server 105 and the account maintained by bank 116, which can cause a temporary discrepancy between the account ledger stored in database 110 and the data in the account record. Note that each bank 116, the system of record server 105, and the payment-service system server 104 track information about the account record, such as account number and balance.

The payment-service system server 104 can periodically synchronize with the bank 116. The more frequently the payment-service-system server 104 synchronizes with bank 116, the less time the two will spend out of sync.

Another reason for a discrepancy may be a credit due to a paycheck being direct deposited in a bank account. While some embodiments described herein have visibility into the credit/debit payment stream, payment-service system server 104 might not have direct access to all transaction data. Some paychecks are directly deposited into an account, which occurs outside of the credit/debit payment stream shown in FIG. 1.

In certain embodiments, the system architecture can be configured to identify such deposits by polling banks or systems of record to identify transactions that took place outside of the credit/debit payment stream(s) that payment-service system server 104 monitors. The more frequently the payment-service-system server 104 synchronizes with bank 116, the less time the two will spend out of sync.

Accessing Payment Resources in Resource Database

Figure 2A:
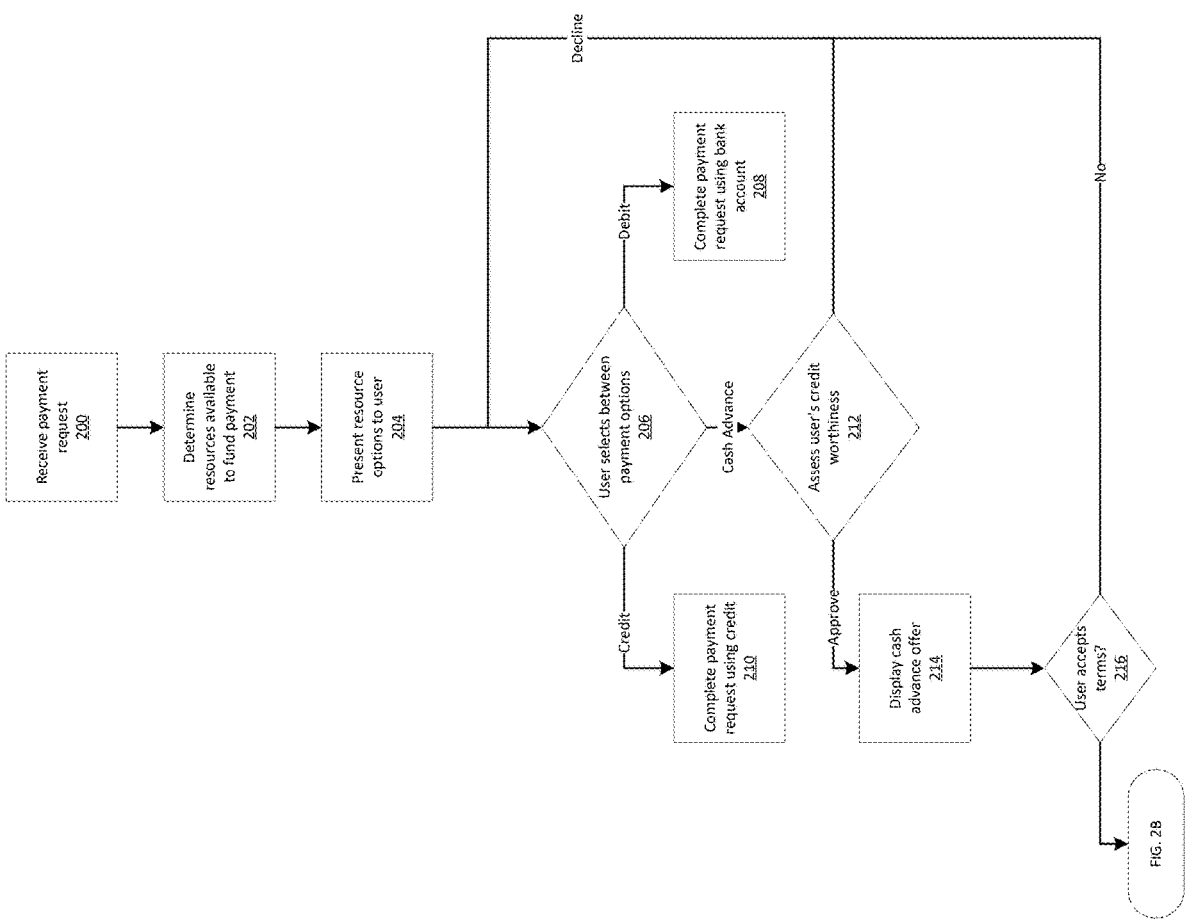
FIG. 2A and FIG. 2B illustrate an example cross-functional flowchart of using an advance funds transfer to make a payment and an example cross-functional flowchart of repaying an advance funds transfer, respectively.
Figure 2B:
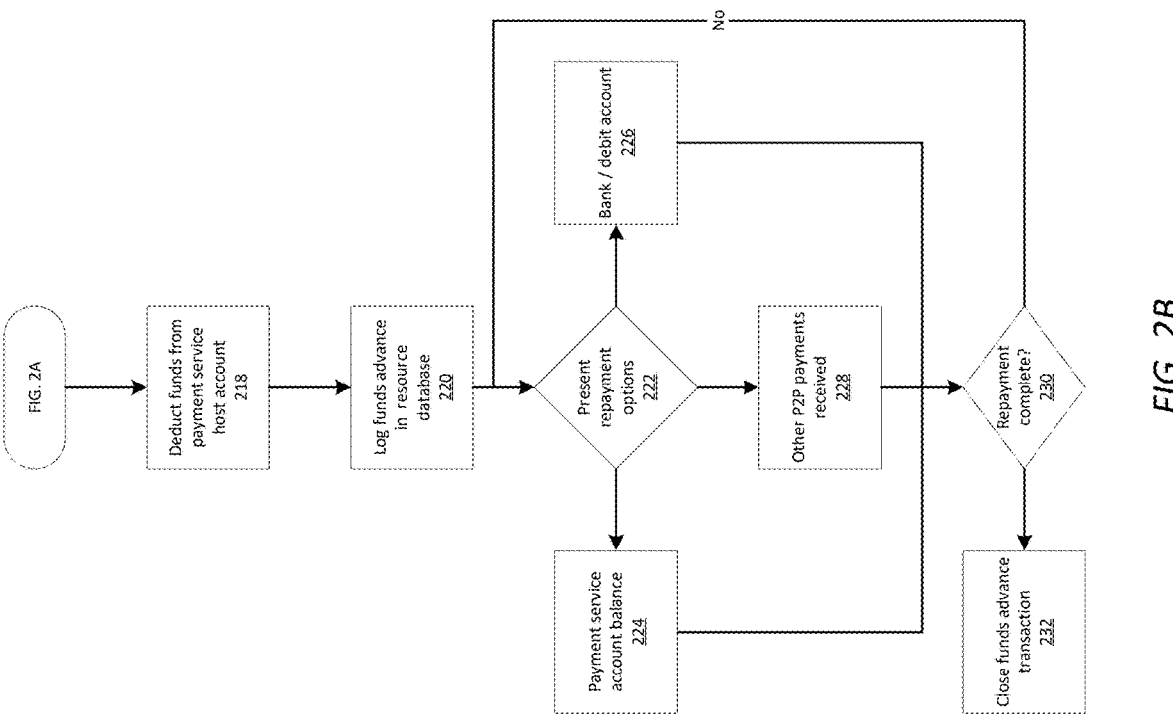

FIGS. 2A and 2B illustrate an exemplary payment flow including interfacing with a resource database to determine which resource to use to fund a transaction. In step 200, a user computing device can receive a payment request, either from another user or the owner of the user computing device. Embodiments of payment requests can also include payments via a virtual or physical card or a peer-to-peer payment.

The user computing device, in step 202, can then query a resource database to determine resources available to fund the payment request, e.g., credit card, debit card, bank account, payment service account balance, or a funds advance. The resource database can contain data structures for storing user profile information, including user name, past purchases, methods of payment, loyalty programs, and resources available to fund the payment request. If no funds are available, the only resource to fund the payment may be an advance funds transfer because there are no funds available in an account.

Step 204 illustrates the user computing device presenting options to the user. In the alternative, the user computing device can have a default payment option, e.g., payment service account balance, and fund the payment using the default payment option, unless the user overrides the default. As an example, the user computing device can display an option to make a payment using the payment service account balance. The user can then override that default option by, for example, entering settings or by providing the user with an option to "choose another option." The user computing device can then present the user with more payment options. Alternatively, the user computing device can proceed with the default payment option, unless the user intervenes to change the payment option. This alternative has the benefit of reducing the number of steps to make a payment.

In step 206, the user can choose to either use the default payment option or to choose one of a plurality of payment options. The selection can be made by, for example, touching a selection on a touch screen or clicking a selection on a web page. In the illustration of FIG. 2A, there are three options: credit, debit, and an advance funds transfer. In some embodiments, the user may select one option to fund the entire transaction. In other embodiments, the user may select more than one option to fund a transaction. For example, the user could choose to fund one-third of the transaction from each option or any other combination. Step 208 illustrates the debit card processing, which for illustrative purposes is shortened to one step, i.e., complete payment request using bank account. The debit card processing can be accomplished via ABA routing numbers or a debit card number. In the ABA routing number embodiment, the payment request can be processed using, for example, an electronic funds transfer (EFT) or an automated clearing house (ACH) transfer. Alternatively, the payment illustrated in step 208 can include a debit transfer using payment network rails and an issue processor. Step 210 illustrates a simplified step for processing a credit payment. If a user has a credit card numbers stored in the resource database, and selects credit as the method of payment, the system can complete a credit transfer using payment network rails and the issue processor system can complete the transaction.

Step 212 illustrates assessing a user's credit worthiness or risk of providing an advance funds transfer embodiment. This embodiment can be completed in real time, or can be performed prior to needing an advance funds transfer. Real time processing can be slightly slower and depends on a network connection to complete the request, whereas performing the assessment prior to needing the advance funds transfer can make the process faster and allows for initiating a transaction without having a network connection. The assessment can be performed by checking with a traditional credit bureau or using a service such as Plaid Technologies, Inc. Embodiments can also not use any credit reporting services, and rely on information that the payment-service system already has, such as credit and debit history. The assessment can include sending personal information, such as name, address, age, account balance, social security number, and an advance funds transfer amount. The assessment can also include looking at how often the user receives funds, either by, for example, making sales or receiving a peer-to-peer (P2P) payment. Either the user computing device or a payment backend server (e.g., payment-service system 113) can perform the credit assessment and decide whether to make the advance funds transfer. If the advance funds transfer is declined, then the process can return back to step 206 and offer the user other options for making a payment. Note that the assessment of credit worthiness can occur prior to presenting the user resources for making a payment. The assessment of credit worthiness has the added benefit of pre-authorizing the advance funds transfer and not having to decline the advance funds transfer. If the advance funds transfer is approved, the user computing device can proceed to step 214 to display the advance funds transfer offer. The offer can include terms and conditions, such as an interest rate, payment schedule, payment amounts, or source of funds for payment (e.g., payment service account balance, future peer-to-peer payment, or bank account). The user computing device can then allow the user to accept or decline the advance funds transfer offer in step 216. If the user declines, the process can return to step 206 and offer the user other options for making the payment. If the user accepts the terms, the process can proceed to step 218, illustrated in FIG. 2B.

After the user accepts the terms of the advance funds transfer, the payment service can transfer funds from a payment service host account to the recipient of the payment transaction, in step 218. The payment service provider can also update a record in the resource database to log the advance funds transfer in the resource database, in step 220. Updating the resource database can include creating a field in the record corresponding to the advance funds transfer, its terms, the recipient, and method of payment for the advance funds transfer.

The payment service provider can also allow the user to pay back the advance funds transfer from the host account of the payment-service system, and step 222 illustrates an example process for repayment. For example, the user computing device can present the user with several payment options, including using a payment service account balance (step 224), using a bank/debit account (step 226), or a P2P payment (step 228). The payment service provider can debit a portion of or the entire amount of the advance funds transfer from the chosen payment option, and determine whether the user paid off the amount of the advance funds transfer in step 230. If the advance funds transfer is not paid off, the system can return to step 222. Step 222 can be accesses by a user request, or a prompt can be generated a predetermined amount of time (e.g., 3 days) before the payment is due to remind the user to make a payment. Ultimately, when step 230 determines that the user paid off the advance funds transfer, the payment service provider can proceed to step 232, which can include modifying the record in the resource database corresponding to the advance funds transfer to record that the advance funds transfer is paid off.

Figure 3:
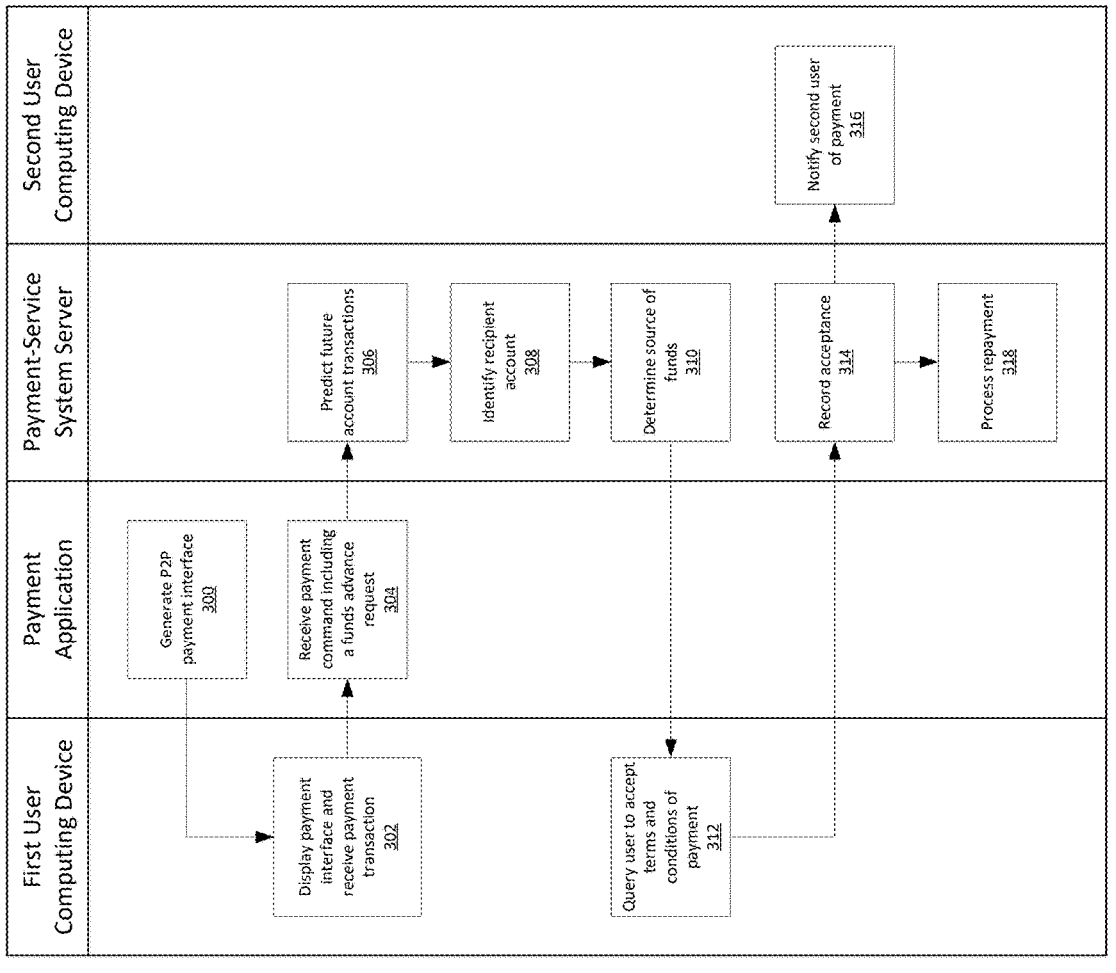
FIG. 3 illustrates a second example cross-functional flowchart of using an advance funds transfer to make a payment.

FIG. 3 illustrates a second embodiment of a cross-functional process for making a payment using the resource database for facilitating peer-to-peer payments over a network. The system listed in this diagram includes a first user computing device, or a payment-service computing device. A second component of the system can be a payment application that can run on the user computing device. A third component of the system is a payment-service system, which can include the resource database. A fourth component of the system is a second user computing device, or a second payment-service computing device. Other components of this system are not illustrated, such as a payment-service computing-device communication interface for enabling communication between the payment-service system and one or more payment-service computing-device processors of the user computing devices. Another component not illustrated includes a network that also facilitates communication between remote components.

In step 300 of this second embodiment, a payment application generates a peer-to-peer payments interface. The peer-to-peer payments interface can include, for example, a selection of recipients, amount of the payment, time of the payment, account to use for the payment, source of funds for the payment and a memo corresponding to the payment. In step 302, the user computing device can display the peer-to-peer payments interface for the user to select payment information. In step 304, the payment application can generate a payment command corresponding to the user's selections; in this example, the user requests to pay using a funds advance. This embodiment assumes that the user has already registered for and logged onto an account on the payment service; therefore, the payment application and the payment service already have certain user profile information, such as name, address, account number(s), and funds associated with the users account(s). The user might not have sufficient funds to pay for the transaction, or the user might have sufficient funds, but would prefer to use an advance funds transfer to pay for the transaction. In such cases, the payment-service system server can assess the user's credit worthiness by identifying relevant criteria to assess the risk associated with an advance of funds not currently available in the account. Other characteristics that the payment-service system can look at include the type of credit card associated with the user, e.g., platinum card holders are more trustworthy than secured card holders. Step 306 illustrates predicting future account transactions, including predicting a future balance based on historical data including recurring debits (e.g., rent, groceries, recurring fees, travel expenses, or peer-to-peer payments) and credits (e.g., peer-to-peer payments, direct deposits, sales, or routine funds transfers) or trends in the account balance, e.g., rising or falling. Predicting future account transactions can also include employment history, which can be inferred from direct deposits from one or more employers over a specified time period. In step 308, the payment-service system server can identify the recipient account that the user selected. Different recipients can have different risk profiles. For example, a payment related to a large purchase, such as a television, would have less risk than purchases related to a shopping spree, e.g., several purchases made in quick succession. Using this information, the payment-service system server can determine the source of funds, e.g., whether to accept the risk and issue an advance funds transfer or choose not to offer an advance funds transfer because the transaction is too risky (step 310). In one example, the amount of the advance funds transfer may vary based on the level of risk associated with each source of funds. The payment-service system server can have a list of approved purchase types or merchants, associated with product codes, MCCs, or other information stored in network packets. If the information in a message or network package is associated with an approved list, an advance funds transfer offer can be made. If the payment-service system server declines to offer the advance funds transfer, the payment application can return to step 300 (not illustrated).

If the payment-service system server approves the advance funds transfer, it can generate terms and conditions associated with the risk profile of the transaction. For example, the interest rate associated with the advance funds transfer could be directly proportional to the risk associated with the transaction. The payment-service system server can generate a transaction to approve the advance funds transfer request and query the user as to whether they would accept the terms and conditions of the advance funds transfer, e.g., interest rate, payment deadlines, and source of repayment. Once the user accepts the terms and conditions in step 312, the user computing device can notify the payment-service system server via a network message or acceptance command that the user accepted the terms and conditions. The payment-service system can then record the acceptance in the resource database in step 314 and credit the user's account for payment to the recipient's account. The credit and debit can happen simultaneously, such that the user cannot use the funds before they are used for paying the recipient. The payment-service system can transfer the funds from the user's account to the recipient's account. In step 316, the payment-service system can notify the recipient of the payment. In step 318, the payment-service system can also store repayment information in, for example, the resource database.

Figure 4:
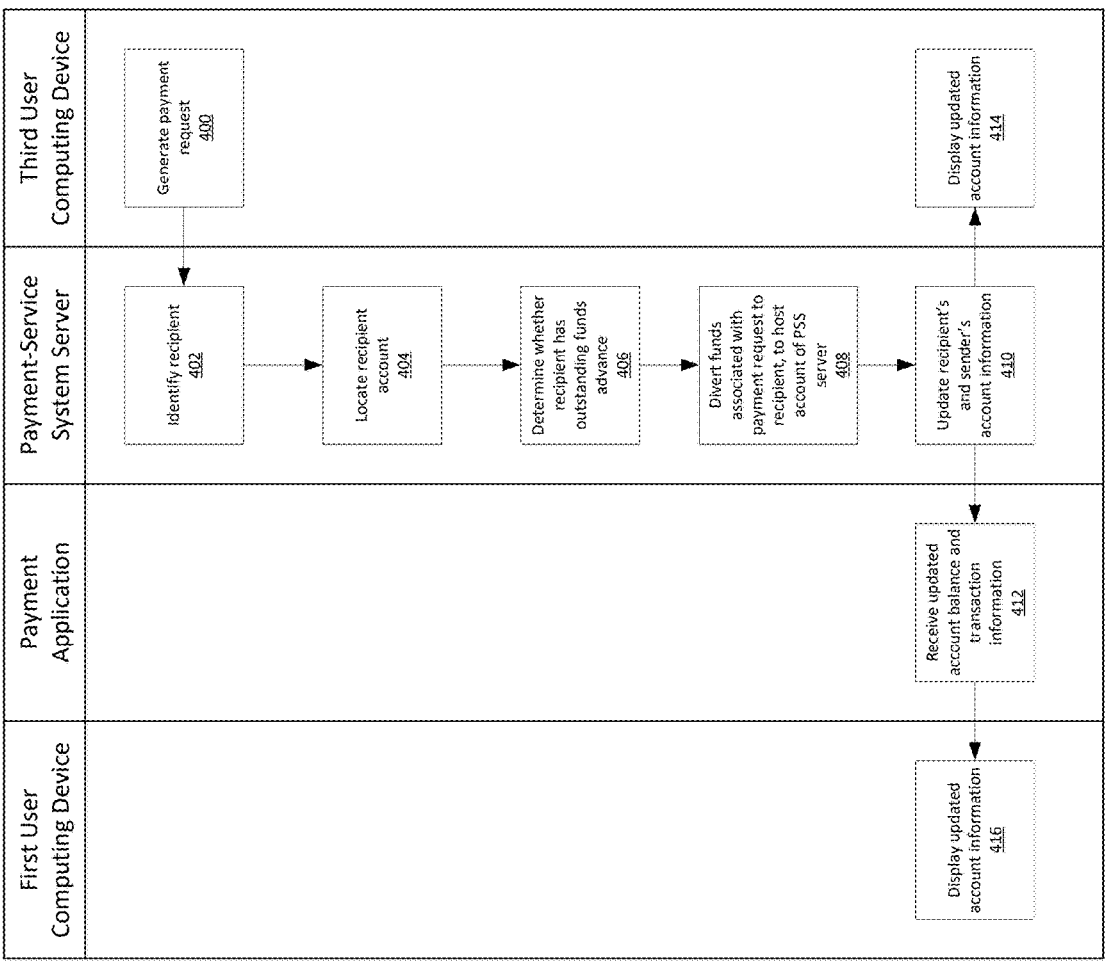
FIG. 4 illustrates a second example cross-functional flowchart of repaying an advance funds transfer.

FIG. 4 illustrates an example of the user repaying the advance funds transfer, and includes similar system components as those illustrated in FIG. 3, except that the second user computing device is substituted for a third user computing device, though other embodiments can also include using the same second user computing device.

The cross-functional process illustrated by FIG. 4 starts with step 400, during which the third user computing device can generate a payment transaction to pay the user of the first user computing device. The payment request can include an amount and a recipient identifier to execute a P2P transaction. The third user computing device can transmit the payment request to the payment-service system, which then associates the recipient identifier with a recipient account (steps 402 and 404). The payment-service system can also determine whether the recipient has an outstanding advance funds transfer that is not paid back (step 406). In this example, the first user computing device made a payment using a funds advance, as illustrated in FIG. 3. If the user has an outstanding balance to pay back due to a prior funds advance transfer, the payment-service system can divert a payment request or peer-to-peer payment comprising funds from a sender to a recipient, to a host account associated with the payment-service system (step 408). Diverting request the payment can include decoding a payment message to determine the recipient, looking up account information of the recipient. The recipient's account information can include a record of an outstanding advance funds transfer for repayment. If there are one or more database records of an outstanding advance funds transfer, then the payment-service system can divert the payment message comprising the funds associated with the payment message from the messages destination account (i.e., the recipient's account) to a host account. The accounts can be stored in separated databases or separate records within a single database. In step 410, the payment-service system can then update the recipient's and the sender's account information. Updating the account information can include debiting the sender's account balance and either crediting the recipient's account balance or crediting the balance due on a previous advance funds transfer that has not been paid back. Updating account information can include retrieving one or more database records containing account balances. The account balances can be debited or credited, depending on the transaction, and the one or more database records can be stored back into the database. After updating the account information, the payment-service system can send a completion message comprising the updated information to payment applications of the respective user computing device (step 412) (note the payment application of the third user computing device is not illustrated). The diverting of the payment message comprising funds can occur in the background on the payment-service system, while the foreground processes presented to the user can be simplified so the user is not aware of the technical methods of completing a payment transaction. Finally, the user computing devices can display the updated account information in steps 414 and 416.

While FIG. 4 illustrates using a P2P payment to make a payment towards a prior funds advance, embodiments include paying back an advance funds transfer from multiple sources. For example, the user can use money transfers, checks, debit cards, credit cards, direct deposit, crypto-currencies (e.g., bitcoin), award points, or any combination of these sources to repay a funds advance. That is, there is no requirement for paying back an advance funds transfer from one source of funds. As previously explained, embodiments can include having separate logical accounts (e.g., savings, checking, vacation, groceries), where the funds for each of these accounts can be stored in one traditional bank account, but logically separated in a resource database. Alternatively, the payment-service system can maintain separate balances for different funds, e.g., US or foreign currency, bitcoins, or award points. Embodiments can include using one or more of these logically separated accounts to repay a funds advance, such that there is no need for funds from a single logical account to be used to repay a funds advance.

Note that the steps described above need not necessarily be executed in the same orders as illustrated. Certain steps may be performed before others. Certain steps may be skipped altogether. And other steps could be added without straying from the concepts described in this disclosure.

The advance funds transfer described above is not the same as a line of credit or the ability to cover an overdraft. A line of credit often requires collateral, and is therefore often cheaper than a funds advance. A funds advancement is also not the same as covering an overdraft because the advance funds transfer is another form of payment, and is not meant to cover the situation where a user pays partially from a balance with the overage covered by a line of credit. In contrast, an advance funds transfer allows the user to withdraw funds and pay them back, even if the user has a sufficient balance to cover a payment.

One benefit of the disclosed system is having visibility across the entire payment process between merchant and vendor. For example, the payment service can also offer point-of-sale (POS) services, e.g., provide a merchant register and associated software. Merchants that use the both a payment service and POS service from the same payment service provider can take advantage of additional functionality. For example, the payment service provider can offer such users different terms on funds advances. The payment service provider can have visibility into the merchant's inventory, sales history, and revenue. If the user has high revenue, they might be more worthy of an advance funds transfer than a user with less revenue. The user can also choose to pay back an advance funds transfer after making sales. Users might also have recurring revenue, e.g., subscription or rent payments. The system can compute, based on these recurring payments, that the user has a steady income source, and can therefore make a prediction that determines the user will have funds coming in that could be used for a line of credit. The system can also look at a user's purchase history. If the user is spending more than they are earning or storing on the system, then the user may not be worthy of receiving a funds advance. For instance, if the user sells an item, the user computing device can present an option to the user to pay back all or a portion of the advance funds transfer.

FIG. 1 provides an example of a system that has visibility into both user purchases and sales. As previously explained, FIG. 1 illustrates a merchant computing device 101 that can communicate with payment-service system 113, which can then log all of the merchants sales. Similarly, the same user may have a client device 115 and use it to make purchases or P2P payments. Client device 115 also communicates with payment-service system 113, and therefore payment-service system 113 has visibility to the user's purchase history. With both of these information sets stored in one of databases 107a-n, including the resource database, the payment-service system 113 can offer the additional functionality.

Figure 5:
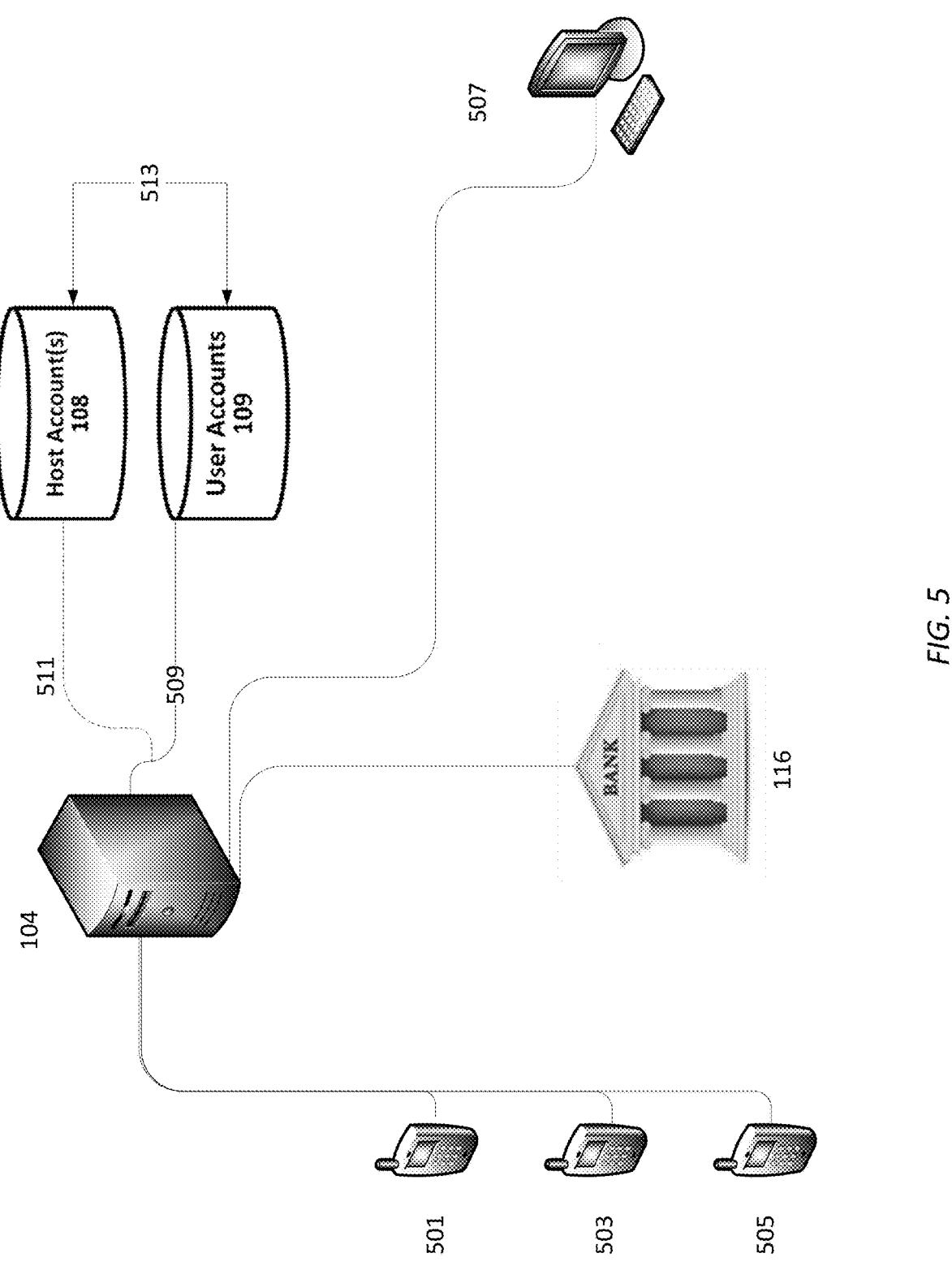
FIG. 5 illustrates a system for transferring funds and diverting a payment message comprising funds in appropriate circumstances.

FIG. 5 illustrates a system for transferring funds, and diverting a payment message comprising funds in appropriate circumstances. The system includes a payee user computing device 507 and three payor user computing devices 502, 503, and 505. The payor user computing devices 502, 503, and 505 can send funds via a peer-to-peer transaction to the payment-service system server 104, where the funds may be directed to a user account corresponding to user computing device 507, and the user account is maintained in user accounts database 109, connected to payment-service system via path 509. The payee user computing device 507 can similarly request a funds transfer, using, for example, an ACH or a debit transaction, from bank 116. Bank 116 can then transfer the funds from its local database to a payment-service system server 104, which can then store the funds in user accounts database 109 via path 509. They user account associated with the payee user computing device can also receive funds from a host account in host account(s) database 108, which can create an outstanding advance funds balance in the user accounts database 109. The funds transfer from host account(s) database 108 to user accounts database 109 can occur via path 513, which can be effected via payment-service system server 104. The payment-service system server 104, when it receives funds from any of payor user computing devices 501, 503, and 505 or the bank 116, can determine whether the account corresponding to payee user computing device 507 has an outstanding balance in its corresponding account record in the user accounts database 109, if so then the payment-service system server 104 can divert the payment message comprising funds from going on path 509 to path 511, destine for host account(s) database 108. All or a portion of the funds can be diverted, and applied accordingly to separate records in the host account(s) database 108 and the user accounts database 109.

Figure 6:
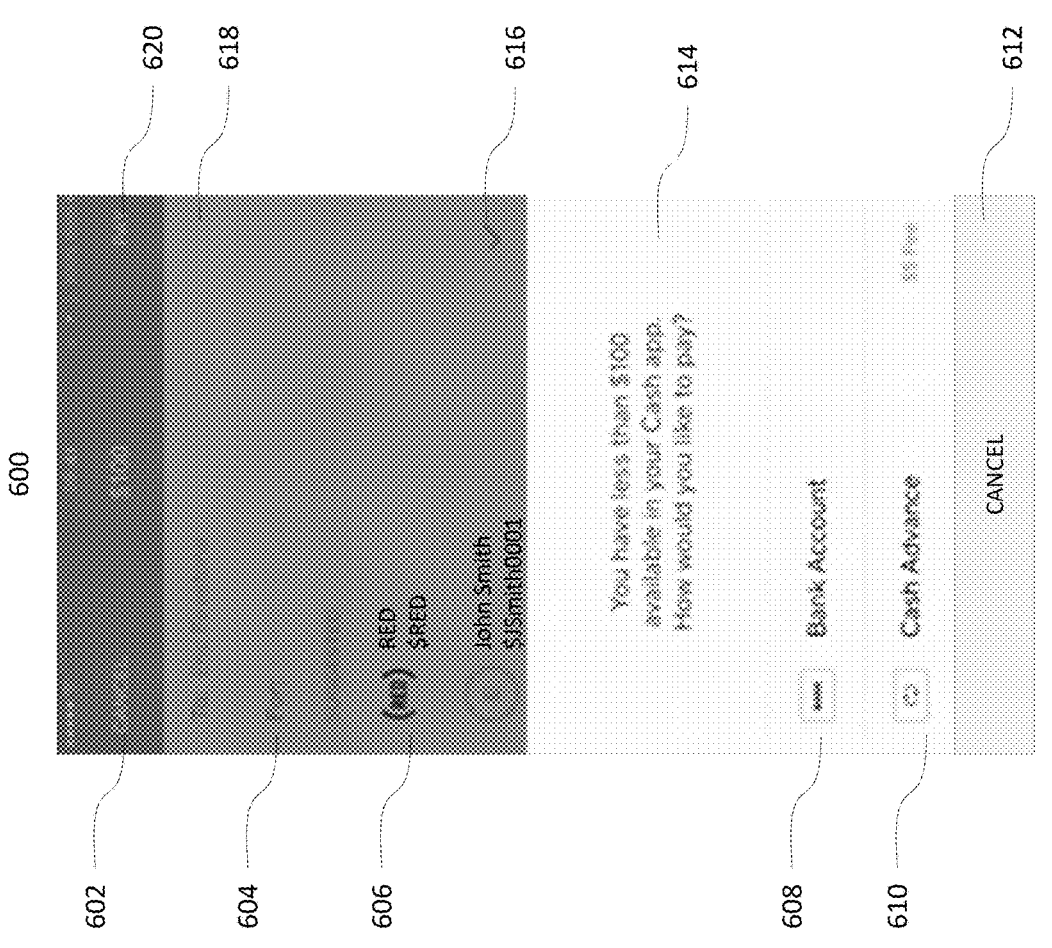
FIG. 6 illustrates an example of presenting payment resource options for making a payment.

FIG. 6 illustrates an example of a user interface 600 presenting payment resource options for making a payment, such as the interface described above in step 202 of FIG. 2A. Prior to reaching this interface, the user might receive a payment request for a $100 payment, and choose to send it to Eric Firestone, as illustrated in row 626, and named in the "To:" field 628. Another possible payee could be "RED," in row 606, but this row lacks a checkmark, and is therefore not selected. The user could have pressed the "PAY" button 520 (rather than the "CANCEL" button 602), which can cause the payment resources to be presented to the user and a corresponding message 624. The message, in this case, notifies the user that they have insufficient funds to make the payment, but they may debit their bank account or request a funds advance. The user interface 600 includes two resources for making a payment: "Bank Account" in row 608, and "Cash Advance $5 Fee" in row 620. The user also has the option of canceling the transaction by pressing the cancel button, 622. Assuming that the user selects the cash advance option, the process would proceed as described previously.

Figure 7:
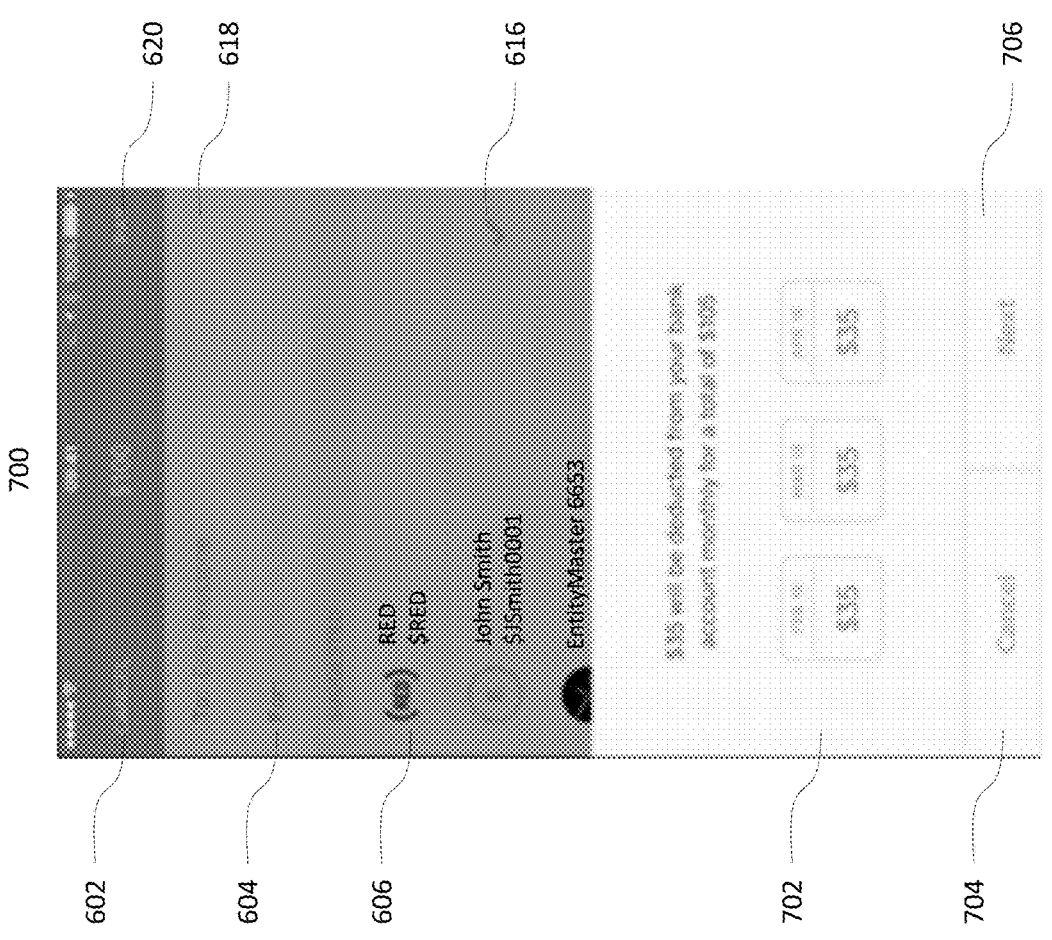
FIG. 7 illustrates an example of terms and conditions associated with an advance funds transfer.

FIG. 7 illustrates an example of terms and conditions user interface 700 associated with a funds advance, which may appear after selecting the cash advance option in row 620 of FIG. 6. This user interface 700 includes many of the same elements in the background as FIG. 6, but includes terms and conditions 702, and an option 704 to cancel the transaction and an option 706 to proceed with the transaction to the next step. In this example, the terms and conditions are to repay the $100 cash advance and $5 fee in three $35 installments, due on the 10th of February, March, and April. After selecting the option 706 to proceed to the next step, the process can proceed to the user interface of FIG. 7.

Figure 8:
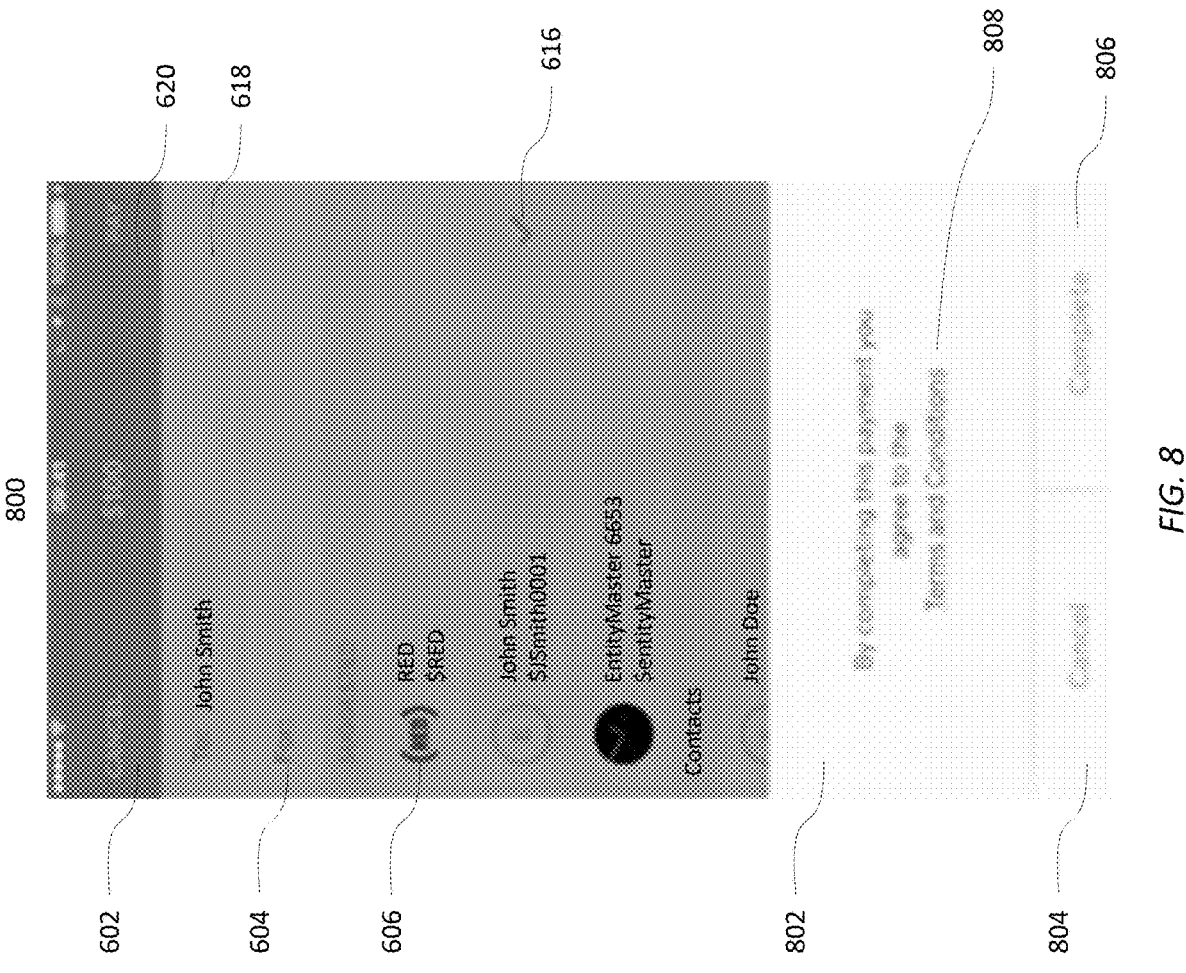
FIG. 8 illustrates an example of a user interface for agreeing to terms and conditions of an advance funds transfer.

FIG. 8 illustrates an example of a user interface 800 for agreeing to terms and conditions of a funds advance, and, similar to FIGS. 6 and 7, user interface 800 can include the same background items. This user interface 800 can include a message 802 requesting that the user agree to the terms and conditions. The message 802 can also include a link 808 to more detailed terms and conditions. The user can choose to press either the cancel button 804 or the complete button 806. Upon completion, the payment can be completed as previously explained.

Figure 9:
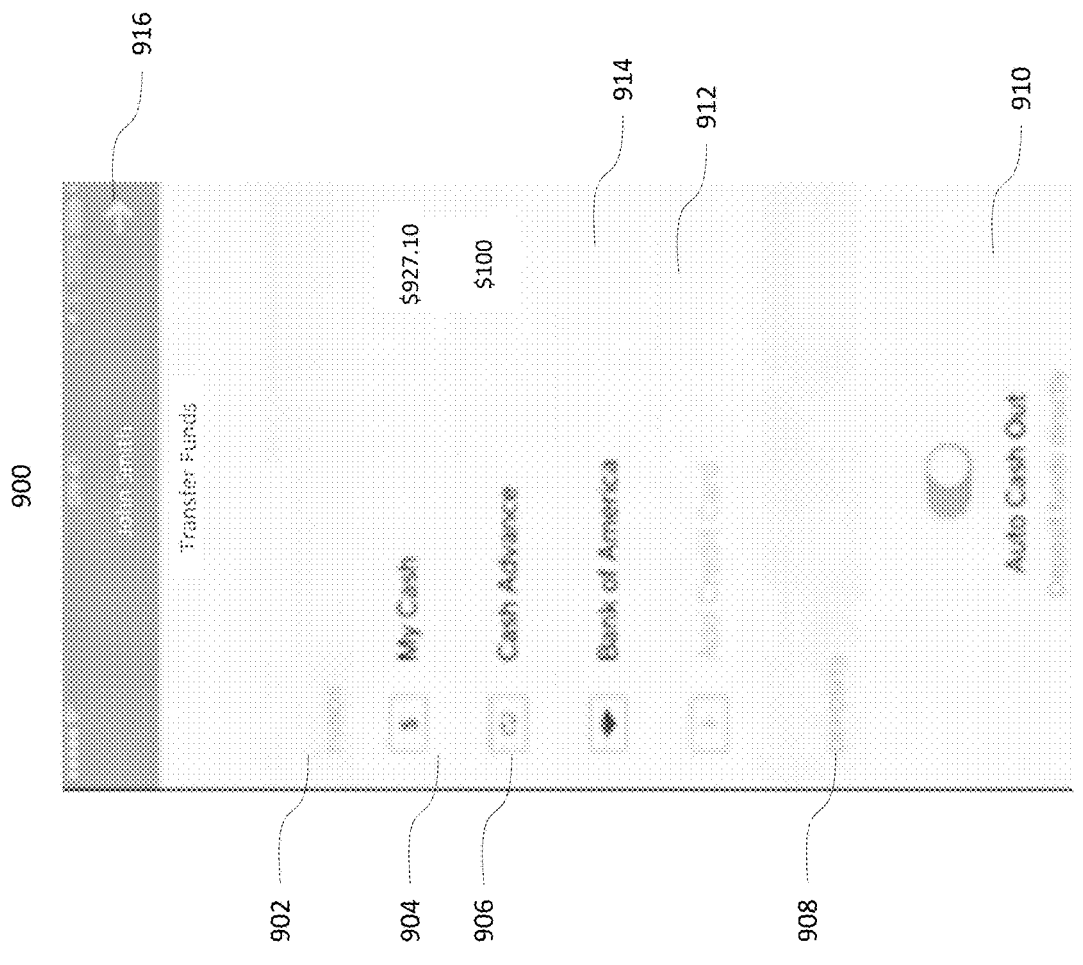
FIG. 9 illustrates an example user interface for selecting payment resource options for making a funds transfer.

FIG. 9 illustrates an example user interface 900 for selecting payment resource options for making a funds transfer for a peer-to-peer payment. The user is given several options for resources of funds 902 to make a payment. These resources include an option 904 to use cash stored in the user's balance (illustrated as $927.98). Option 906 allows the user to request a cash advance, with a $5 fee. Option 914 allows the user to use a bank account (e.g., "Bank of America") to make a funds transfer. Option 912 allows the user to add a credit card to the account. Currently, this example account does not include a credit card. There can also be options 908 for deposits. In this case, there is an "Auto Cash Out" option 910, which can allow users to automatically cash out their balances to a bank account. In this example, this option is off, such that the user maintains a balance of $927.98.

The present disclosure is here described in detail with reference to embodiments illustrated in the drawings, which form a part here. Other embodiments may be used or other changes may be made without departing from the spirit or scope of the present disclosure. The illustrative embodiments described in the detailed description are not meant to be limiting of the subject matter presented here.

Various embodiments will now be described in further detail. The following description provides specific details for a thorough understanding and enabling description of these embodiments. One skilled in the relevant art will understand, however, that the embodiments discussed herein may be practiced without many of these details. Likewise, one skilled in the relevant art will also understand that the embodiments can include many other obvious features not described in detail herein. Additionally, some well-known structures or functions may not be shown or described in detail below, to avoid unnecessarily obscuring the relevant description.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Although certain illustrative, non-limiting exemplary embodiments have been presented, various changes, substitutions, permutations, and alterations can be made without departing from the scope of the appended claims. Further, the steps of the methods described herein may be carried out in any suitable order, or simultaneously where appropriate. Thus, the scope of the invention should not necessarily be limited by this description.

Unless specifically stated otherwise as apparent from the following discussion, it is appreciated that throughout the description, discussions utilizing terms such as "processing," "computing," "transmitting," "receiving," "determining," "displaying," "identifying," "presenting," "establishing," or the like, can refer to the action and processes of a data processing system, or similar electronic device that manipulates and transforms data represented as physical (electronic) quantities within the system's registers and memories into other data similarly represented as physical quantities within the system's memories or registers or other such information storage, transmission or display devices. The system or portions thereof may be installed on an electronic device.

The exemplary embodiments can relate to an apparatus for performing one or more of the functions described herein. This apparatus may be specially constructed for the required purposes, or it may comprise a special purpose computer selectively activated or reconfigured by a computer program stored in the computer. Such a computer program may be stored in a machine (e.g. computer) readable storage medium, such as, but is not limited to, any type of disk including floppy disks, optical disks, CD-ROMs and magnetic-optical disks, read only memories (ROMs), random access memories (RAMs) erasable programmable ROMs (EPROMs), electrically erasable programmable ROMs (EEPROMs), magnetic or optical cards, or any type of media suitable for storing electronic instructions for operations on a processor, and each coupled to a bus.

The exemplary embodiments described herein are described as software executed on at least one server, though it is understood that embodiments can be configured in other ways and retain functionality. The embodiments can be implemented on known devices such as a personal computer, a special purpose computer, cellular telephone, personal digital assistant ("PDA"), a digital camera, a digital tablet, an electronic gaming system, a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

The exemplary embodiments can relate to an apparatus for performing one or more of the functions described herein. This apparatus may be specially constructed for the required purposes or be selectively activated or reconfigured by computer executable instructions stored in non-transitory computer memory medium or non-transitory computer-readable storage medium.

It is to be appreciated that the various components of the technology can be located at distant portions of a distributed network or the Internet, or within a dedicated secured, unsecured, addressed/encoded or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying or communicating data to and from the connected elements. The term "module" as used herein can refer to any known or later developed hardware, software, firmware, or combination thereof that is capable of performing the functionality associated with that element.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Presently preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A method comprising:

receiving, by one or more servers of a payment service and from a first application executing on a first device of a first user associated with a first account, a first payment request identifying a second account of a second user associated with a second device;

determining, by the one or more servers, that the second account of the second user does not have sufficient funds to satisfy an amount of the first payment request;

generating, by the one or more servers, an offer of funds to satisfy the first payment request, the offer of funds comprising a plurality of payment installments for repayment of the amount of the first payment request over a predetermined time period;

transmitting, by the one or more servers and to a second application executing on the second device, the offer of funds, the offer of funds being displayed via a user interface of the second device;

in response to receiving, by the one or more servers, and from the second application, an acceptance of the offer of funds, causing the amount of the first payment request to be transferred from a host account owned by the payment service to the first account of the first user;

subsequent to the amount of the first payment request being transferred to the first account, receiving, by the one or more servers and from the second application, a second payment request identifying a third account of a third user associated with a third device;

transmitting, by the one or more servers and to a third application executing on the third device, the second payment request; and in response to receiving, by the one or more servers and from the third application, an indication of acceptance of the second payment request and determining that the second account has an outstanding balance associated with the repayment of the amount associated with the offer of funds:

intercepting, by the one or more servers, a payment message comprising instructions to deposit at least a first portion of a value of funds corresponding to the second payment request from the third account into the second account in a peer-to-peer (P2P) transfer facilitated by the payment service; and responsive to intercepting the payment message and prior to any funds associated with the payment message being deposited into any account, modifying, by the one or more servers, the instructions of the payment message to divert the first portion of the value of funds corresponding to the second payment request to the host account instead of being deposited into the second account.

2. The method of claim 1, wherein the modified instructions cause the first portion of the value of funds corresponding to the outstanding balance to be deposited into the host account and a second portion corresponding to a remaining value of funds to be deposited into the second account.

3. The method of claim 1, wherein intercepting the payment message comprises diverting the payment message from being directed to the second account to being directed to the host account, and wherein diverting the payment message further comprises:

decoding the payment message to determine a payment recipient, wherein the payment recipient corresponds to the second user of the second device; and identifying account information of the payment recipient, wherein diverting the payment message is in response to determining that the account information of the payment recipient includes at least one record of an outstanding advance funds transfer for repayment.

4. The method of claim 1, wherein the offer of funds corresponds to an offer of an advance funds transfer.

5. The method of claim 1, further comprising:

causing the user interface displayed within the second application executing on the second device to display a plurality of funding sources associated with the second account concurrently with one or more generated terms and conditions for providing at least the first portion of the value of the offer of funds to satisfy the first payment request.

6. The method of claim 1, wherein prior to receiving the second payment request, the method further comprises:

receiving, by the one or more servers, transaction data associated with a sale of one or more items by the second user; and causing, by the one or more servers, the second device to display a message via the user interface, the message comprising an option associated with the repayment of the outstanding balance, the option corresponding to a transaction amount corresponding to the sale.

7. The method of claim 6, wherein the offer corresponds to repayment of all or a portion of the outstanding balance.

8. The method of claim 1, wherein generating the offer of funds is based at least in part on assessing a risk of providing the offer of funds based on factors comprising one or more of a type of transaction, a type of recipient, the amount of funds, a debit history, a credit history, a credit score, and an employment history.

9. The method of claim 1, wherein generating the offer of funds is based at least in part on:

predicting, based on a transaction history associated with the second account, a predicted amount of funds to be received into the second account from one or more of a plurality of funding sources associated with the second account within a second predetermined time period, wherein predicting the predicted amount of funds to be received into the second account comprises determining that the second account is to receive funds equal to or greater than the amount of the first payment request, wherein the offer of funds is equal to or less than the predicted amount of funds.

10. The method of claim 9, wherein the predicted amount of funds to be received into the second account comprises a predicted amount of credits predicted to be received into the second account from a direct deposit source.

11. The method of claim 1, wherein causing the amount of the first payment request to be transferred further comprises:

recording, by the one or more servers, the acceptance of the offer of funds in a record of the second account stored in a data store of the payment service;

deducting, from the host account, the amount corresponding to the first payment request; and crediting, to the first account of the first user, the amount of the first payment request.

12. The method of claim 1, further comprising:

receiving, by the one or more servers, and from a merchant computing device, purchase information associated with the first device; and storing, by the one or more servers into a database, the purchase information, wherein generating terms and conditions associated with the offer of funds is further based at least in part on the purchase information.

13. A non-transitory computer-readable medium comprising instructions that, when executed by one or more processors of a payment service, cause the one or more processors to perform operations comprising:

receiving, from a first application executing on a first device of a first user associated with a first account, a first payment request identifying a second account of a second user associated with a second device;

determining that the second account of the second user does not have sufficient funds to satisfy an amount of the first payment request;

generating an offer of funds to satisfy the first payment request, the offer of funds comprising a plurality of payment installments for repayment of the amount of the first payment request over a predetermined time period;

transmitting, to a second application executing on the second device, the offer of funds, the offer of funds being displayed via a user interface of the second device;

in response to receiving, from the second application, an acceptance of the offer of funds, causing the amount of the first payment request to be transferred from a host account managed by the payment service to the first account of the first user;

subsequent to the amount of the first payment request being transferred to the first account, receiving, from the second application, a second payment request identifying a third account of a third user associated with a third device; and in response to receiving, from a third application executing on the third device of the third user, an indication of acceptance of the second payment request and determining that the second account has an outstanding balance associated with the repayment of the amount associated with the offer of funds:

intercepting a payment message comprising instructions to deposit at least a first portion of value of funds corresponding to the second payment request from the third account into the second account in a peer-to-peer (P2P) transfer facilitated by the payment service; and responsive to intercepting the payment message and prior to any funds associated with the payment message being deposited into any account, modifying the instructions of the payment message to divert the first portion of the value of funds corresponding to the second payment request to the host account instead of being deposited into the second account.

14. The non-transitory computer-readable medium of claim 13, wherein the modified instructions cause the first portion of the value of funds corresponding to the outstanding balance to be deposited into the host account and a second portion corresponding to a remaining value of funds to be deposited into the second account.

15. The non-transitory computer-readable medium of claim 13, wherein prior to receiving the second payment request, the operations further comprise:

receiving transaction data associated with a sale of one or more items by the second user; and causing the second device to display a message via the user interface, the message comprising an option associated with the repayment of the outstanding balance, the option corresponding to a transaction amount corresponding to the sale.

16. The non-transitory computer-readable medium of claim 15, wherein the offer corresponds to repayment of all or a portion of the outstanding balance.

17. The non-transitory computer-readable medium of claim 13, wherein generating the offer of funds is based at least in part on assessing a risk of providing the offer of funds based on factors comprising one or more of a type of transaction, a type of recipient, the amount of funds, a debit history, a credit history, a credit score, and an employment history.

18. A payment service computing platform associated with a payment service, the payment service computing platform comprising:

a non-transitory computer-readable storage medium including instructions; and one or more processors coupled to the non-transitory computer-readable storage medium, the one or more processors configured to execute the instructions to perform operations comprising:

receiving, from a first application executing on a first device of a first user associated with a first account, a first payment request identifying a second account of a second user associated with a second device;

determining that the second account of the second user does not have sufficient funds to satisfy an amount of the first payment request;

generating an offer of funds to satisfy the first payment request, the offer of funds comprising a plurality of payment installments for repayment of the amount of the first payment request over a predetermined time period;

transmitting, to a second application executing on the second device, the offer of funds, the offer of funds being displayed via a user interface of the second device;

in response to receiving, from the second application, an acceptance of the offer of funds, causing the amount of the first payment request to be transferred from a host account owned by the payment service to the first account of the first user;

subsequent to the amount of the first payment request being transferred to the first account, receiving, from the second application, a second payment request identifying a third account of a third user associated with a third device; and in response to receiving, from a third application executing on the third device of the third user, an indication of acceptance of the second payment request and determining that the second account has an outstanding balance associated with the repayment of the amount associated with the offer of funds:

intercepting a payment message comprising instructions to deposit at least a first portion of value of funds corresponding to the second payment request from the third account into the second account in a peer-to-peer (P2P) transfer facilitated by the payment service; and responsive to intercepting the payment message and prior to any funds associated with the payment message being deposited into any account, modifying the instructions of the payment message to divert the first portion of the value of funds corresponding to the second payment request to the host account instead of being deposited into the second account.

19. The payment service computing platform of claim 18, wherein causing the amount of the first payment request to be transferred further comprises:

recording the acceptance of the offer of funds in a record of the second account stored in a data store of the payment service;

deducting, from the host account, the amount corresponding to the first payment request; and crediting, to the first account of the first user, the amount of the first payment request.

20. The payment service computing platform of claim 18, the operations further comprising:

causing the user interface displayed within the second application executing on the second device to display a plurality of funding sources associated with the second account concurrently with one or more generated terms and conditions for providing at least the first portion of the value of the offer of funds to satisfy the first payment request.

\* \* \* \* \*